No. 782,633. PATENTED FEB. 14, 1905.
S. A. WARE.
COMBINED CULTIVATOR AND HARROW.
APPLICATION FILED OCT. 10, 1904.
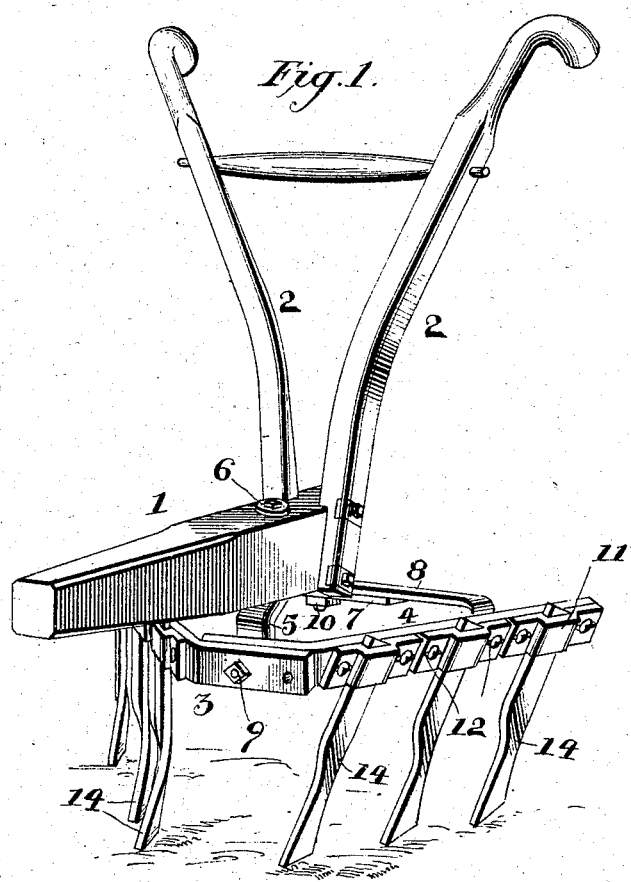
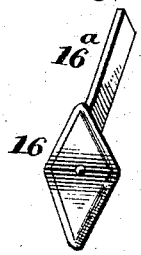
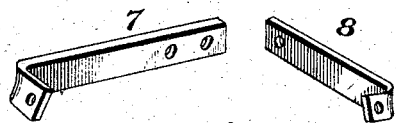
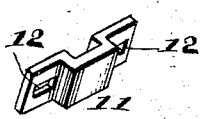
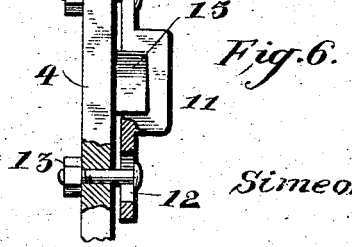
WITNESSES:
W. S. Rockwell
Amos W. Hart
INVENTOR
Simeon A. Ware
BY
Munn & Co.
ATTORNEYS No. 782,633. Patented February 14, 1905.

UNITED STATES PATENT OFFICE.

SIMEON A. WARE, OF HYDE, GEORGIA.

COMBINED CULTIVATOR AND HARROW.

SPECIFICATION forming part of Letters Patent No. 782,633, dated February 14, 1905.

Application filed October 10, 1904. Serial No. 227,772.

*To all whom it may concern:*

Be it known that I, SIMEON A. WARE, a citizen of the United States, residing at Hyde, in the county of Wilkes and State of Georgia, have made certain new and useful Improvements in a Combined Cultivator and Harrow, of which the following is a specification.

My invention is an improvement in cultivators, which are adapted for lateral adjustment, so that the two opposite sets or rows of cultivating-teeth may be placed nearer each other or farther apart, as the conditions of the crop to be cultivated require.

The object of my invention is to simplify the attachment of the cultivating devices to the beam of the implement and to facilitate the lateral adjustment of the teeth and also to facilitate the insertion of the cultivating-teeth in the removable frame of the sockets or keepers.

The invention is embodied in the construction, arrangement, and combination of parts hereinafter described and claimed, the same being illustrated in the accompanying drawings, in which—

Figure 1 is a perspective view of my invention. Fig. 2 is a front view of a cultivator-tooth and its shank, the same being adapted for substitution for harrow-teeth. Fig. 3 is a perspective view of the rear cross-bars which connect the side bars of the frame to which the cultivating-teeth are attached. Fig. 4 is a front view of an alternative form of harrow-teeth. Fig. 5 is a perspective view of one of the keepers or clamps by which the shanks of the different teeth are secured to the frame of the implement. Fig. 6 is mainly a plan view, parts being broken away, of a portion of one of the side bars of the frame, together with a keeper or clamp and the shank of a harrow or other tooth.

A beam 1 is provided with handles 2 in a well-known manner. To the under sides of the beam 1 is attached the iron or steel frame to which the cultivating or other teeth are secured. The said frame consists of two obtuse-angle bars 3 and 4, and the same are connected at their front ends with an obtuse-angle arm 5, whose upper end is secured by a bolt 6 to the beam 1, while the rear portions of said bars are connected adjustably by cross-bars 7 and 8, which are shown detached in Fig. 3. The front ends of the side bars 3 4 are lapped one over the other and secured to the pendent arm 5 by means of a single screw-bolt 9. The bar 3 has two or more holes, so that lateral adjustment of the bars 3 and 4 toward or from each other is provided for. A similar adjustment of the rear ends or portions of the side bars 3 4 is provided for by the bars 7 8, which are similarly overlapped, and, as shown in Fig. 3, one of them, 7, is provided with two or more holes for reception of the bolt 10, that secures them to the beam 1 in rear of the point of attachment of the handles 2. Thus by shifting the bolts 9 and 10 from one hole to another in the respective bars 3 and 7 the width of the frame, and thereby the distance between the cultivating-teeth, may be varied as conditions require—for example, according to the width between rows of growing plants which are to be cultivated. It will be seen that the cultivating attachment proper is secured and also adapted for adjustment laterally by means of but two bolts 9 and 10.

The adjustment may be easily and quickly made. As shown in Figs. 1 and 6, the cultivating or harrow teeth, as the case may be, are secured to the side bars 3 and 4 by means of keepers 11, which are in the nature of clamps. As shown best in Fig. 5, the keepers have a central socket adapted to receive the shanks of the cultivating or harrow teeth, and the ends of the keepers have also extended rectangular slots 12, through which pass screw-bolts 13, (see Fig. 6,) that secure the keepers in due position. As shown in Fig. 6, the depth of the socket in the keepers is less than the thickness of the shanks 15 of the teeth, so that a small space is always left between the extended slotted ends of the keepers and the adjacent side of the bars 3 and 4. Thus by means of the nuts applied to the bolts 13 the shanks of the cultivating or harrow teeth may be clamped with any degree of force required for holding them rigidly in position for work. It is apparent that by this means of securing the teeth, whatever may be the form of their lower ends, they may be adjusted higher or lower, either individually or all together, it being only necessary to loosen the nuts applied to the screw-bolts 13 and after adjusting the teeth as required again screwing up the nuts so as to bind the teeth firmly by the friction-clamps 11. It will be further seen that the provision of the lengthwise slots 12 in the keepers or clamps 11 enables the latter to be adjusted along the bars 3 and 4, so as to bring the teeth nearer to or farther from each other, as conditions may require. The sockets of the keepers or clamps 11 are also inclined forward and have a uniform diameter vertically, so that the teeth 14 are held inclined forward as well as adapted for adjustment vertically.

In Fig. 1 I show a form of harrow-teeth 14 in which the narrow edge of the bar composing the tooth is forward or on the working side, while in Fig. 4 I illustrate another form of tooth, 15, in which the broad side of the tooth is forward.

In Fig. 2 I illustrate a diamond-shaped cultivating-tooth 16, which is suitably attached to a shank $16^a$. I thus provide different forms of teeth whereby the implement is adapted to work as a cultivator proper or as a harrow, as conditions may require.

Having thus described my invention, what I claim as new, and desire to secure by Letters Patent, is—

The improved cultivating implement, comprising a beam and handles, and a cultivating attachment consisting of two obtuse-angled side bars whose forward ends are lapped and provided with perforations, an angular arm pendent from the beam, and bolts passing through the same and the lapped ends of the side bars, lapped rear bars 8 and a bolt passing through the perforations in the same and securing them to the rear end of the beam, the said side bars being provided with keepers, and teeth secured therein, all substantially as described.

SIMEON A. WARE.

Witnesses:
E. E. ROBERTS,
J. B. ROBERTS.